United States Patent Office 3,366,620
Patented Jan. 30, 1968

3,366,620
2-CHLORO-4-NITROPHENYL-AZOPYRAZOLONE DYESTUFF
Hans-Gerhard Hanke, Leverkusen, Gerhard Wolfrum, Opladen, and Hermann Wunderlich, Cologne, Mulheim, Germany, assignors to Farbenfabriken Bayer Aktiengesellschaft, Leverkusen, Germany, a corporation of Germany
No Drawing. Original application Nov. 3, 1964, Ser. No. 408,688, now Patent No. 3,324,105, dated June 6, 1967. Divided and this application Oct. 24, 1966, Ser. No. 588,760
Claims priority, application Germany, Nov. 15, 1963, F 41,287
1 Claim. (Cl. 260—163)

ABSTRACT OF THE DISCLOSURE

Azo dyestuff of the formula:

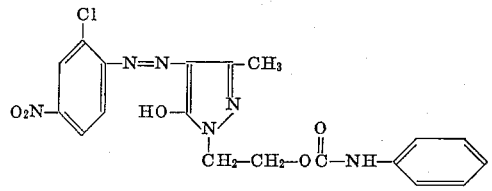

useful for the dyeing and printing of synthetic fibers, such as polyolefines, terephthalic acid polyglycols and superpolyamides, and cellulose ester fibers.

---

This is a divisional application of copending Ser. No. 408,688 filed Nov. 3, 1964, and now U.S. Patent No. 3,324,105.

The invention relates to novel azo dyestuffs; more particularly it relates to azo dyestuffs which are insoluble or barely soluble in water and which correspond to the formula

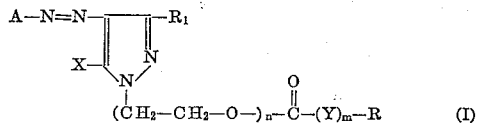

In this formula A stands for the residue of a diazo component, X stands for a hydroxyl or amino group, $n$ for the number 1 or 2, Y for the grouping —NH— or —O—, $m$ for the number 0 or 1, R for an aliphatic, araliphatic, cycloaliphatic or aromatic radical and $R_1$ for a lower alkyl radical, a radical of the benzene series, a carbalkoxy or carbalkoxyalkyl group; the dyestuffs are free of sulphonic acid and carboxylic acid groups.

The new azo dyestuffs are obtained when a diazo compound is coupled with a coupling component of the general formula

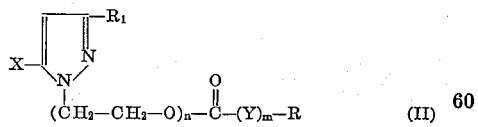

in 4-position, selecting starting components which are free from sulphonic and carboxylic acid groups.

The starting components are preferably coupled in a neutral to weakly acid aqueous, organic or aqueous-organic medium and the dyestuffs obtained, which are barely soluble to insoluble in water, are isolated in the usual way.

Among the diazo components A—$NH_2$ those of the benzene, (benz)thiazole and thiadiazole series are preferred; the diazo components may have non-ionic substituents such as cyano, halogeno, e.g. —Cl and —Br, nitro, lower alkyl sulphonyl, e.g. methyl sulphonyl and ethyl sulphonyl, lower alkyl, preferably those having 1 to 4 carbon atoms, lower alkoxy, preferably those having 1 to 3 carbon atoms, carbo lower alkoxy groups the alkyl radicals of which having 1 to 4 carbon atoms, aryl substituents such as phenyl and substituted phenyl (for instance by the above-mentioned substituents), sulphonamide and substituted sulphonamide groups, for instance alkyl or dialkyl substituted sulphonamide groups the alkyl groups of which having 1 to 5 carbon atoms.

Suitable diazo components are e.g. 2-nitroaniline, 4-nitroaniline, 2 - chloro-4-nitroaniline, 4-chloro-2-nitroaniline, 2,6-dichloro-4-nitroaniline, 2,4-dinitro-6-chloro-aniline, 2-cyano - 4 - nitroaniline, 2,4-dinitro-6-bromoaniline, 2-bromo-4-nitro-6-cyano-aniline, 4-methylsulfonylaniline, 2-bromo-4-ethylsulfonylaniline, 2-bromo-4-ethylsulfonyl-6-nitroaniline, 2-methoxy-4-nitroaniline, 4-cyano-aniline, 3,4 - dicyano - aniline, 2 - cyano-4- or -5-chloroaniline, 4-chloroaniline, 2,4 - dichloroaniline, 4 - amino-benzoic acid methyl ester, 4-amino-benzoic acid-n-butyl ester, 4-carbethoxy - 2 - nitroaniline, 5-amino - 3 - methylthiadiazole-1,2,4,5 - amino - 3 - phenyl-thiadiazole - 1,2,4,5-amino-3-benzyl - mercapto - thiadiazole-1,2,4, 5-nitro-2-aminothiazole, 2 - amino - 6 - methyl-sulfonylbenzothiazole-1,3, 4-amino-azobenzene and 2-amino-anisole.

The azo components to be used according to the invention are obtained by reaction of pyrazoles of the formula

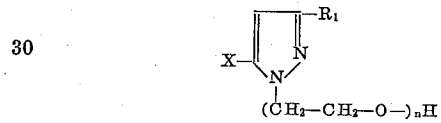

wherein X, $R_1$ and $n$ have the above-mentioned meaning, with organic acid anhydrides, acid chlorides, acid semiester chlorides, isocyanates or chloro-carbonic acid esters. Suitable acylating agents are for example acetic anhydride, propionic acid chloride, succinic acid semiester chloride, benzoyl chloride, 2,4-dichlorobenzoyl chloride, methyl isocyanate, ethyl isocyanate, cyclopentyl isocyanate, cyclohexyl isocyanate, phenyl isocyanate, p-chlorophenyl isocyanate and ethyl chloroformate. From this collection it is apparent that the aliphatic, araliphatic, cycloaliphatic and aromatic radicals R in the coupling components of the Formula II can be further substituted by the usual substituents with the exception of sulphonic and carboxylic acid groups. A special case of the further substitution of aliphatic radicals is given, for example, when acid semiester chlorides such as succinic acid semiester chlorides are used for the production of the components (II), leading to the grouping —$(CH_2)_z$—$COOR_2$ for the radical R; in this, z stands for a whole number, preferably for a whole number from 1 to 4, and $R_2$ preferably for a lower alkyl radical.

For the production of the new dyestuffs the following compounds are suitable for example:

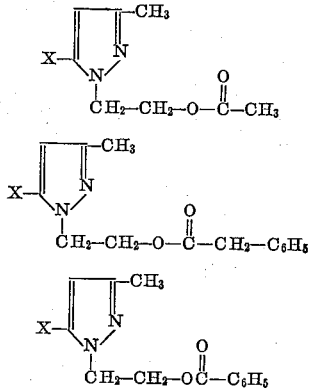

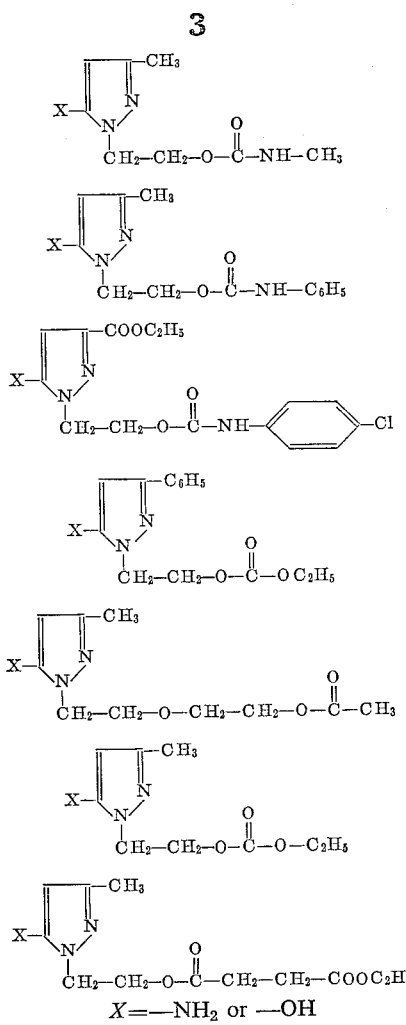

X = —NH₂ or —OH

The new dyestuffs are outstandingly suitable for the dyeing and printing of synthetic fibres, especially of polyolefine fibres, particularly nickel-modified polypropylene, of terephthalic acid polyglycol ester fibres and synthetic superpolyamide fibres as well as cellulose ester fibres (2½- and triacetyl cellulose), or fabrics and knitted materials produced therefrom. Since the dyestuffs are insoluble or only slightly soluble in water, the dyeing is expediently carried out in the presence of dispersing compounds. For accelerating the dyeing, swelling agents can be added to the dyebath in the usual way; dyeing may also be carried out at elevated temperatures in closed apparatus.

The following examples are given for the purpose of illustrating the invention, the parts being parts by weight.

*Example 1*

5.4 parts of 2-chloro-4-nitroaniline are stirred with 20 parts of concentrated hydrochloric acid at room temperature for 4 hours and, after the addition of 30 parts of ice water, diazotized with 20 parts of a 10% sodium nitrite solution at 0 to 5° C. The diazonium salt solution is then poured into a solution of 5.6 parts of the pyrazolone of the formula

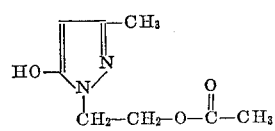

in 100 parts of water and 85 parts of a 20% sodium carbonate solution. After 30 minutes the dyestuff is precipitated by the addition of some common salt. It has the following constitution

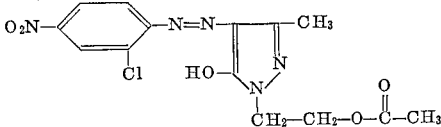

The production of the azo components proceeds by molar reaction of 1β-hydroxyethyl-3-methyl pyrazolone-(5) with acetic anhydride in acetic acid or water at 50 to 80° C.

25 parts of the yellow dyestuff obtained according to this example are ground with 75 parts of a condensation product from β-naphthalene sulphonic acid and formaldehyde and with 120 parts of water for 24 hours in a ball mill. The paste is then dried in vacuum at 50° C. and the residue finely ground.

1 part of this dyestuff powder is stirred into 1000 parts of hot water which contains 8–10 parts of a carrier, e.g. benzoic acid, and is adjusted with sulphuric acid to a pH of about 4.5. A very fine dyestuff dispersion is obtained into which 50 parts of polyester fibres are introduced at 40 to 60° C. The dyebath is heated to the boil within 20 minutes and kept at this temperature for one to one and a half hours. The dyed material is then thoroughly rinsed with water and dried. A yellow dyeing is obtained with very good fastness to wetting, sublimation and light.

The dyeings on polyesters show the same very good fastness properties if the process is carried out with a dispersion in water without carrier additive in a closed dyeing apparatus at temperatures between 105 and 130° C.

*Example 2*

If the azo component in Example 1 is replaced by the equivalent amount of a pyrazolone of the formula

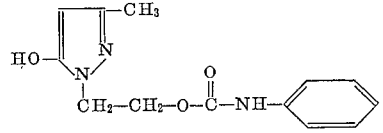

the following dyestuff is obtained

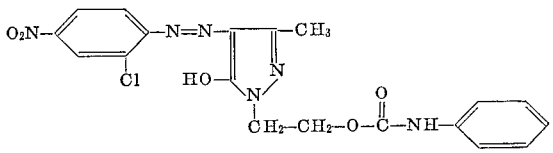

which dyes polyester fibres yellow with good fastness properties.

The azo components can be produced by reacting equimolar amounts of 1-β-hydroxyethyl-3-methyl pyrazolone-(5) with phenyl isocyanate in acetonitrile at 50 to 60° C. in the presence of catalytic amounts of pyridine.

What is claimed is:
1. The dyestuff of the formula

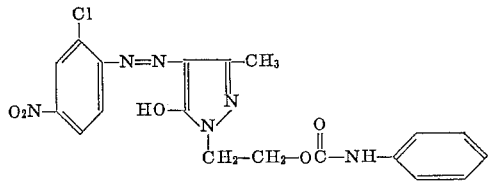

References Cited

UNITED STATES PATENTS

| | | | |
|---|---|---|---|
| 1,758,383 | 5/1930 | Wagner et al. | 260—163 |
| 2,634,262 | 4/1953 | Piepenbrink et al. | 260—163 |
| 3,198,783 | 8/1965 | Lewis | 260—163 |

CHARLES B. PARKER, *Primary Examiner.*

F. HIGEL, *Assistant Examiner.*